UNITED STATES PATENT OFFICE.

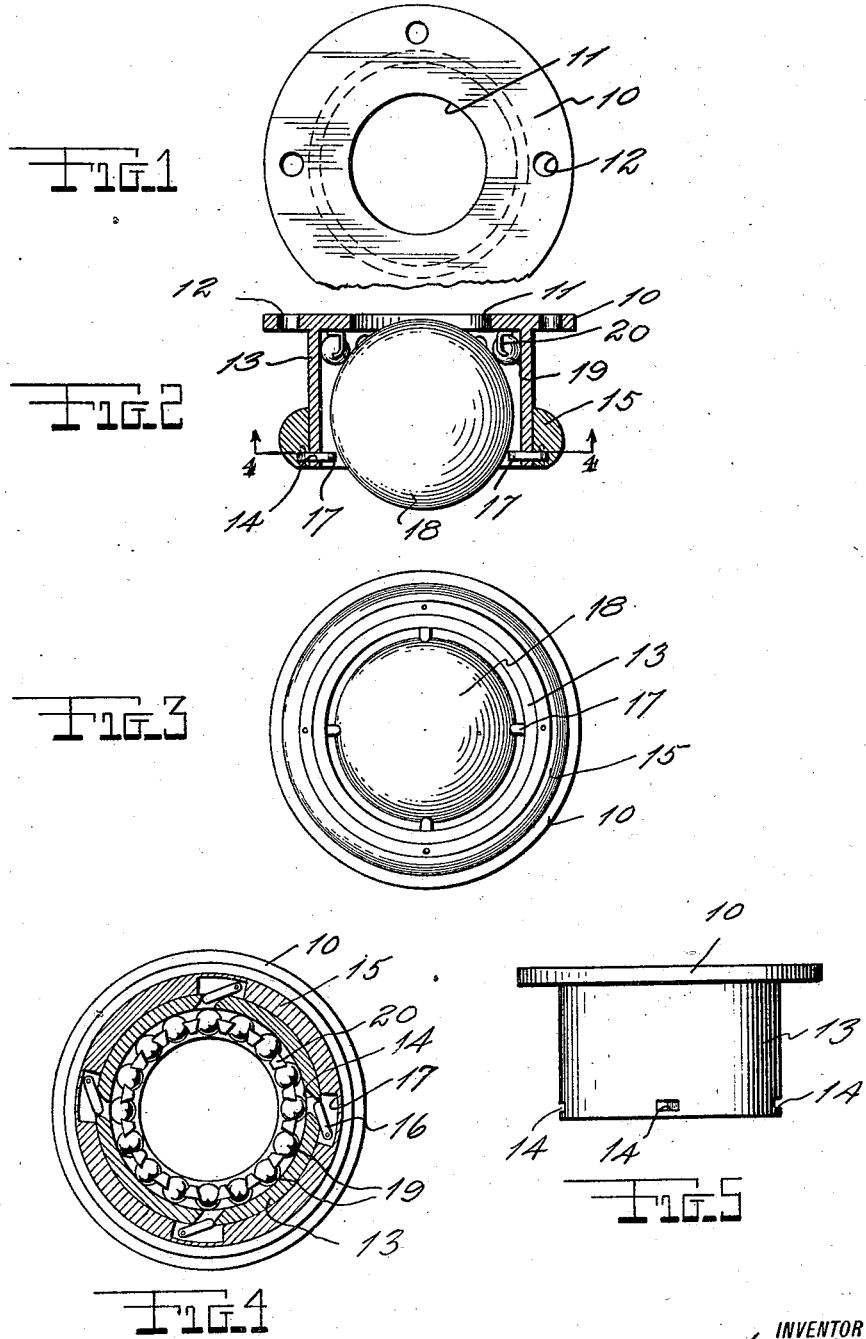

AUGUST H. ROTH, OF NEW YORK, N. Y.

CASTER.

1,407,171.    Specification of Letters Patent.    Patented Feb. 21, 1922.

Application filed May 12, 1921. Serial No. 469,039.

*To all whom it may concern:*

Be it known that I, AUGUST H. ROTH, a citizen of Jugo-Slovakia, residing at New York, in the county of New York and State of New York, have invented certain new and useful Improvements in Casters, of which the following is a specification.

This invention relates to improvements in casters and has for its principal object to provide a device having anti-friction bearings to render it readily movable in any direction.

Another object of the invention resides in the provision of a caster the rotating element of which comprises a sphere arranged to operate against a ball race and having releasable means for retaining the sphere in place in the cage.

With these and other objects in view the invention consists in the novel construction, combination and arrangement of parts which will be fully set forth in the following specification, claimed and illustrated in the accompanying drawing, in which, Figure 1 is a top plan view of the caster, Figure 2 is a vertical sectional view through Figure 1, Figure 3 is a bottom plan view of Figure 1, Figure 4 is a sectional view on line 4—4 of Figure 2, and, Figure 5 is a side view in elevation of the sphere retaining cage.

Referring to the drawings in detail the numeral 10 designates the attaching plate of the device having a central opening 11 formed therein. A plurality of openings 12 are arranged in the plate intermediate its outer and inner edge for the reception of a suitable attaching means such as screws. Formed integrally with the under side of the plate is a tubular cage member 13 formed near its lower end with a plurality of slots 14 the walls of which are inclined as shown in Figure 4 for a purpose to be more fully hereinafter described.

Rotatably arranged adjacent the lower end of the cage member 13 is a ring 15 formed with a plurality of recesses 16 in which the retaining tongues 17 are pivoted. As shown in Figure 4 the free ends of the tongues are adapted to enter the slots 14 so that when the ring is rotated in a clockwise direction their ends will engage the inclined walls of the slots and be guided inwardly so that the said tongues will project through the slots and into the cage as shown in Figures 2 and 3.

A spherical bearing member or roller 18 is adapted to be received within the cage and engage an annular series of bearing balls 19 arranged in a suitable ball retainer 20 which bears against the under side of the plate 10.

Obviously the spherical member 18 will be retained against accidental displacement by the tongues 17 and when it is so desired the said spherical member may be removed by rotating the ring 15 in a counter-clockwise direction, thereby withdrawing the tongues.

While in the foregoing there has been shown and described the preferred embodiment of this invention, it is to be understood that minor changes in the details of construction, combination and arrangement of parts may be made without departing from the spirit and scope of the invention as claimed.

What is claimed is:

A caster comprising, an attaching plate, a tubular cage depending from the plate, a spherical bearing member adapted to be received in the cage, the cage having slots formed near its lower end; tongues adapted to be projected through the slots, a ring surrounding the cage and connected to the tongues for projecting and withdrawing the same, and anti-friction bearings at the upper end of the cage against which the bearing member runs.

In witness whereof I affix my signature.

AUGUST H. ROTH.